(12) United States Patent
Miyakawa

(10) Patent No.: US 7,118,706 B2
(45) Date of Patent: Oct. 10, 2006

(54) METHOD OF SEALING A SILICON NITRIDE FILTER

(75) Inventor: Naomichi Miyakawa, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 128 days.

(21) Appl. No.: 10/140,162

(22) Filed: May 8, 2002

(65) Prior Publication Data
US 2002/0185787 A1 Dec. 12, 2002

(30) Foreign Application Priority Data
May 11, 2001 (JP) ............................. 2001-141931

(51) Int. Cl.
C04B 35/65 (2006.01)
C04B 14/04 (2006.01)
(52) U.S. Cl. ...................................... 264/647; 264/676
(58) Field of Classification Search ................ 264/647, 264/676, 628, 642
See application file for complete search history.

(56) References Cited

U.S. PATENT DOCUMENTS

| | | | | |
|---|---|---|---|---|
| 4,293,357 A * | 10/1981 | Higuchi et al. | ........... | 156/89.22 |
| 5,648,028 A * | 7/1997 | Miyake et al. | ............... | 264/647 |
| 5,846,276 A * | 12/1998 | Nagai et al. | .................... | 55/523 |
| 5,853,444 A | 12/1998 | Maier et al. | | |
| 6,565,797 B1 * | 5/2003 | Miyakawa et al. | .......... | 264/628 |
| 2002/0066982 A1 * | 6/2002 | Yamaguchi et al. | ......... | 264/631 |
| 2002/0178707 A1 * | 12/2002 | Vance et al. | .................. | 55/523 |
| 2002/0185787 A1 | 12/2002 | Miyakawa | | |

FOREIGN PATENT DOCUMENTS

| | | |
|---|---|---|
| EP | 0 737 801 | 10/1996 |
| EP | 0 816 065 | 1/1998 |
| EP | 0 899 003 | 3/1999 |
| JP | 57-7215 | 1/1982 |
| JP | 58-95658 | 6/1983 |
| JP | 5-85865 | 4/1993 |
| JP | 8-243329 | 9/1996 |
| WO | WO 01/47833 A1 * | 5/2001 |

OTHER PUBLICATIONS

Translation of JP5895658, "Method for Manufacturing a Sintered Form of Silicon Nitride", Schreiber Translations, Jun. 2004.*
U.S. Appl. No. 09/975,262, filed Oct. 12, 2001, Pending.
U.S. Appl. No. 10/140,162, filed May 8, 2002, Pending.
U.S. Appl. No. 10/892,200, filed Jul. 16, 2004, Miyakawa et al.

(Continued)

*Primary Examiner*—Steven P. Griffin
*Assistant Examiner*—Carlos Lopez
(74) *Attorney, Agent, or Firm*—Oblon, Spivak, McClelland, Maier & Neustadt, P.C.

(57) ABSTRACT

A method for sealing a silicon nitride filter having a generally columnar outer shape and a plurality of through-holes mutually parallel to one another, extending between the opposing end surfaces, which comprises selectively packing a composition containing metal silicon particles in the vicinity of the opening of the through-holes to be sealed on each end surface, subjecting the silicon nitride filter to a heat treatment in a nitrogen atmosphere so that the metal silicon particles contained in the composition are nitrided and formed into silicon nitride for sealing.

20 Claims, 4 Drawing Sheets

OTHER PUBLICATIONS

U.S. Appl. No. 10/140,162, filed May 8, 2002, Miyakawa.
U.S. Appl. No. 10/901,171, Jul. 29, 2004, Shinohara et al.
U.S. Appl. No. 11/287,461, filed Nov. 28, 2005, Shinohara et al.
U.S. Appl. No. 11/240,509, filed Oct. 3, 2005, Shinohara et al.

* cited by examiner

METHOD OF SEALING A SILICON NITRIDE FILTER

The present invention relates to a method for sealing a silicon nitride filter having a generally columnar outer shape and having a plurality of through-holes mutually parallel to one another, extending between the opposing end surfaces, with which excellent air-tightness and durability can be obtained, and which is particularly suitable for a silicon nitride filter for diesel particulates, and a sealing composition to be used therefor.

A ceramic filter is widely used as e.g. a filter for removing diesel particulates discharged from a diesel engine, a support for an exhaust gas clarification catalyst or a dust-proof filter in a high temperature gas. Particularly, a silicon nitride filter has attached an attention as a filter for removing diesel particulates in view of its excellent heat resistance, corrosion resistance and thermal shock resistance.

A silicon nitride filter having a generally columnar outer shape and having a plurality of through-holes mutually parallel to one another, extending between the opposing end surfaces, is formed usually by e.g. extrusion. In many cases, one end of the plurality of through-holes mutually parallel to one another, extending between the opposing end surfaces, is sealed and the other end is left open when the filter is used. For example, as a representative filter, a honeycomb filter consisting of a prism, a cylinder or an elliptic cylinder having a plurality of through-holes parallel to one another in a length direction may be mentioned. In the honeycomb filter, usually the filter end surface is sealed in a checkered pattern so that one end surface of each through-hole is sealed and the other end surface is left open.

As a method of sealing such a filter having a plurality of through-holes mutually parallel to one another, extending between the opposing end surfaces, JP-A-57-7215 proposes a method of covering the end surfaces of the honeycomb body with a film, punching the film at a part to be sealed with a pinholder in a checkered pattern, and injecting a body or paste of the same material as the filter from the holes for sealing. However, in this method, the material of the same material as the sealed filter may undergo sintering in the heat treatment process and firing shrinkage may take place, whereby the injected part may open, or e.g. cracks may form on the wall at the sealed part, thus decreasing air-tightness. Further, with this method, a predetermined part may not accurately be sealed due to e.g. breakage of the film or position slippage, or leavings from the film when punched with a pinhole may remain.

JP-A-5-85865 proposes, in order to overcome the problem by firing shrinkage, a method wherein the particle size proportion of ceramic particles in a sealing material is based on coarse grains. However, if the particle size proportion is based on coarse grains, although the firing shrinkage may be reduced, sintering may not adequately proceed and the strength of the sealing material itself may be inadequate, and the sealing material may be peeled off from the filter.

Further, JP-A-8-243329 proposes as a sealing material for a honeycomb containing silicon carbide as the main component, a mixture comprising silicon carbide, carbon and a silicon compound. With this method, the silicon compound and carbon are reacted and sintered to form silicon carbide, whereby the firing shrinkage is reduced, and the strength is sufficient. However, the sealing material can be used as a sealing material only for a silicon carbide filter. Further, the treatment temperature is so high as from 1,700 to 2,300° C., and production is difficult.

Under these circumstances, it is an object of the present invention to provide a method for sealing a silicon nitride filter having a generally columnar outer shape and having a plurality of through-holes mutually parallel to one another, extending between the opposing end surfaces, which is easily carried out, with which excellent air-tightness and durability can be obtained, and which is particularly suitable for a silicon nitride filter for diesel particulates.

The present invention provides a method for sealing a silicon nitride filter having a generally columnar outer shape and a plurality of through-holes mutually parallel to one another, extending between the opposing end surfaces, which comprises selectively packing a composition containing metal silicon particles in the vicinity of the opening of the through-holes to be sealed, subjecting the silicon nitride filter to a heat treatment in a nitrogen atmosphere so that the metal silicon particles contained in the composition are nitrided and formed into silicon nitride for sealing.

Figure 1:
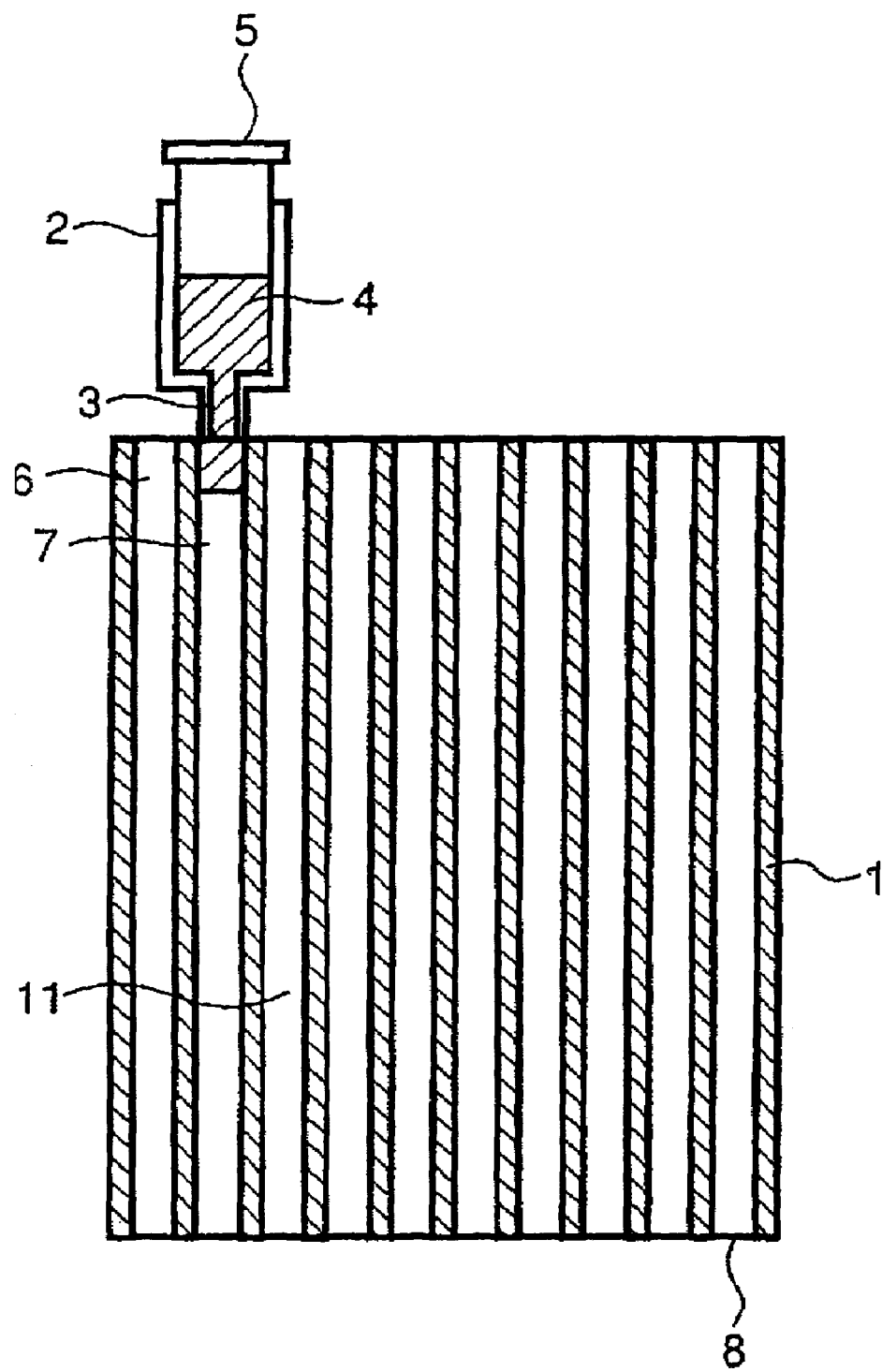
FIG. 1 is a schematic longitudinal section illustrating a filter at the time of packing a masking material.

Now, the present invention will be described in further detail with reference to the preferred embodiments.

In the method of sealing a silicon nitride filter of the present invention (hereinafter referred to as the present sealing method), the silicon nitride filter (hereinafter referred to simply as a filter) is not particularly limited so long as it is a porous filter having a generally columnar outer shape and having a plurality of through-holes mutually parallel to one another, extending between the opposing end surfaces, and containing at least 50 mass % (hereinafter referred to simply as %) of silicon nitride. Further, the number of the end surfaces of the filter (hereinafter referred to simply as end surfaces) is usually two in the case of e.g. a honeycomb filter.

In the present sealing method, a composition containing metal silicon particles as the main component is selectively packed in the vicinity of the opening of the through-holes to be sealed on the end surfaces, and the silicon nitride filter is subjected to a heat treatment in a nitrogen atmosphere so that the composition is nitrided and formed into silicon nitride for sealing.

The metal silicon particles contained in the composition are not particularly limited, but preferred are high purity ones which are formed into silicon nitride having a high purity by a nitriding reaction, whereby excellent properties such as heat resistance can be obtained. The metal silicon particles more preferably have an average particle diameter from 1 to 150 μm. If the average particle diameter is less than 1 μm, the metal silicon particles are likely to oxidize in the air, and on the other hand, if the average particle diameter exceeds 150 μm, the particles tend to be too large, whereby space are likely to form between the sealing material and the filter wall surface in the inside of the through-holes.

Further, if the amount of the metal silicon particles is less than 70% in the solid content of the composition, shrinkage is likely to occur, such being unfavorable. On the other hand, if it exceed 98%, nitriding is less likely to be accelerated, such being unfavorable.

The composition preferably contains oxide particles in addition to the metal silicon particles, whereby nitriding of the metal silicon particles is accelerated, and further, mechanical strength of the nitrided composition (hereinafter referred to simply as a sealing material) improves. It is more preferred that the composition contains from 70 to 98% of the metal silicon particles and from 2 to 30% of the oxide particles as the solid content.

The oxide particles are not particularly limited, but preferably consist of at least one member selected from the group consisting of alumina, iron oxide, yttria, spinel, magnesia and ytterbium oxide.

When the oxide particles consist of alumina or iron oxide, nitriding of the metal silicon particles is accelerated, and the nitriding temperature is decreased, such being preferred. When the oxide particles consist of alumina, such an advantage can be obtained that a part of the oxide particles react with silicon nitride to form a solid solution, thus increasing oxidation resistance. The average particle diameter of the oxide particles is preferably from 1 to 20 μm, whereby the effect can be obtained with a small amount.

Here, if the amount of the oxide particles is less than 2% in the solid content of the composition, it is difficult to obtain the effect of the addition of oxide particles, which is disadvantageous. On the other hand, if it exceeds 30%, the coefficient of thermal expansion of the sealing material after nitriding tends to increase, and the thermal shock resistance tends to decrease, such being unfavorable.

Further, when the composition is packed in the vicinity of the opening of the through-holes, the composition preferably contains a binder for molding and a solvent, whereby packing is easily carried out.

The binder for molding is not particularly limited so long as it is an organic binder to be used for ceramic molding, however, the lower the amount of carbon remaining after thermal decomposition, the better. Such an organic binder may, for example, be polyvinyl alcohol, polyvinyl acetate or methyl cellulose. The amount of the binder for molding is preferably from 2 to 5% by outer percentage based on the solid content of the composition excluding the binder for molding.

The solvent may be water or an organic solvent such as an alcohol. The amount of the solvent is preferably from 20 to 80% by outer percentage based on the solid content of the composition.

In the present invention, the method of packing the composition may, for example, be a dipping method wherein the filter is immersed in the composition containing a solvent, or a method wherein the composition is injected to a part of the filter to be sealed. Advantages such as a high productivity can be obtained when the dipping method is employed, which can easily be carried out.

In the present sealing method, the composition may selectively be packed directly in the vicinity of the opening of the through-holes to be sealed, however, it is preferred to first pack a masking material in the vicinity of the opening of through-holes other than the through-holes to be sealed, i.e. the through-holes to be left open, whereby the composition can be packed all at once in the part to be sealed by the dipping method. Here, in the present specification, the vicinity of the opening is within from about 20 to about 30 mm from the end surface.

As the sealing method when a masking material is used, a masking material is packed in the opening of through-holes to be left open on the end surfaces first, then the composition is packed in the opening of through-holes to be sealed on the end surfaces, then the masking material is removed, and the entire filter having the composition alone packed therein is subjected to a heat treatment in a nitrogen atmosphere. By the heat treatment, the metal silicon particles in the composition packed in the end surfaces of the silicon nitride filter are directly nitrided and formed into silicon nitride.

The masking material is not particularly limited so long as it is easily packed in the through-holes and easily removed from the through-holes after the object is achieved, however, preferred is an organic substance having a small amount of carbon remaining after the thermal decomposition, whereby the nitriding reaction is likely to proceed smoothly without carbonization of the metal silicon in the composition.

The masking material is preferably an organic polymer, particularly preferably a thermoplastic polymer, as it is easily packed in the through-holes and can easily be removed by e.g. thermal decomposition. Such a masking material may, for example, be methyl cellulose, polyethylene glycol, polyethylene oxide or paraffin. It is particularly preferred to employ polyethylene glycol as the masking material, as one having a melting point within a range from room temperature to 90° C. is easily available, and the solidification phenomenon can be utilized for packing of the masking material.

As a method of packing the masking material, a method wherein a liquid masking material is put in a packing apparatus having an injection port which can go into the through-holes, and the liquid masking material is packed in every through-hole in the filter, followed by drying, or a method wherein a liquid masking material is put in a similar packing apparatus, the liquid masking material is packed in every through-hole in the filter which is held at a temperature lower than the melting point of the masking material so that the masking material is solidified substantially simultaneously with the packing, may, for example, be mentioned.

As a method of removing the masking material, a removal method by heat dissolution or an extraction method with a solvent may, for example, be mentioned. The removal method by heat dissolution is preferred since operation is easy and the productivity is high. As conditions of the heat dissolution, the temperature-raising rate is from 100 to 600° C./h, the holding temperature is from 300 to 800° C., the holding time is from 1 to 10 hours, and the atmosphere is not particularly limited, but preferred is an air atmosphere or a nitrogen atmosphere.

In the present invention, the composition contains metal silicon particles, and the metal silicon particles are subjected to a heat treatment in an atmosphere of nitrogen (hereinafter sometimes referred to as nitriding) and formed into silicon nitride, whereby substantially no firing shrinkage occurs, and decrease in air-tightness due to the firing shrinkage can be avoided.

In the present invention, the holding temperature in the heat treatment is preferably from 1,100 to 1,800° C. If the holding temperature is less than 1,100° C., the nitriding reaction may not adequately proceed, and the metal silicon may remain to deteriorate heat resistance, such being unfavorable. On the other hand, if the holding temperature exceeds 1,800° C., decomposition of silicon nitride formed by the nitriding may begin, mechanical strength may decrease, and leakage of e.g. particulates from the filter may occur.

The holding time in the heat treatment is preferably from 1 to 24 hours, particularly preferably from 4 to 12 hours. If the holding time is less than 1 hour, there is possibility that the nitriding reaction may not adequately proceed. On the other hand, if the holding time exceeds 24 hours, the nitriding reaction hardly proceed any further, and the productivity tends to decrease. Even in a process of temperature raising, if the temperature is within the specified range, the time passed will be included in the holding time.

The temperature raising rate may suitably be selected depending upon e.g. the size or the shape of the filter, or the number of the filters to be subjected to a heat treatment, but it is preferably from 50 to 600° C./h, whereby the nitriding ratio tends to be high. In the present invention, the nitrogen atmosphere is an atmosphere containing substantially solely nitrogen without containing oxygen, but it may contain another inert gas. The nitrogen partial pressure in the nitrogen atmosphere is preferably at least 50 kPa.

Now, the present invention will be described in further detail with reference to Examples. However, it should be understood that the present invention is by no means restricted to such specific Examples.

EXAMPLE 1

A cylindrical honeycomb filter 1 having a diameter of 15 cm and a length of 15 cm, obtained by extrusion, was used. The size of through-holes 11 is 1.8×1.8×150 mm. In FIG. 1 is shown a longitudinal section illustrating the honeycomb filter 1 in a length direction.

The masking method will be explained with reference to FIG. 1. In order to pack a masking material 4 into a part 7 which would not to be sealed, an injector 2 (volume: 200 cm$^3$) having an injection port 3 (outer diameter: 1.5 mm, inner diameter: 1 mm) smaller than the through-holes 11 was used as a masking packing apparatus.

In a cylinder of the injector 2, polyethylene glycol having a molecular weight of 10,000 (melting point: about 60° C.) as the masking material 4 is contained. A predetermined amount of the polyethylene glycol was packed by pressing a piston 5. This operation is carried out with respect to all the parts 7 to be masked formed in a checkered pattern. Here, the entire injector 2 is held at 70° C. so that the polyethylene glycol is not solidified but in a liquid state, and on the other hand, the honeycomb filter 1 is held at a temperature of at most 50° C. so that the packed polyethylene glycol is solidified. Here, the numerical reference 6 designates the vicinity of the opening of the through-holes. A composition 10 (not shown in FIG. 1) is packed in the vicinity 6 of the opening of the through-holes, and the composition 10 functions as a sealing material after nitriding.

Figure 2:
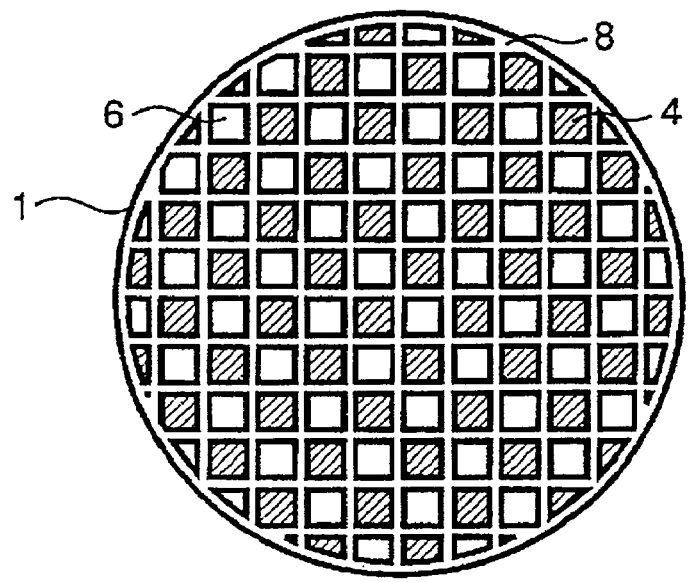
FIG. 2 is a schematic plan view illustrating the end surface of a filter when masking is completed.

In FIG. 2 is shown an outer appearance of the end surface 8 when the masking is completed. The making material 4 is packed in a checkered pattern.

Figure 3:
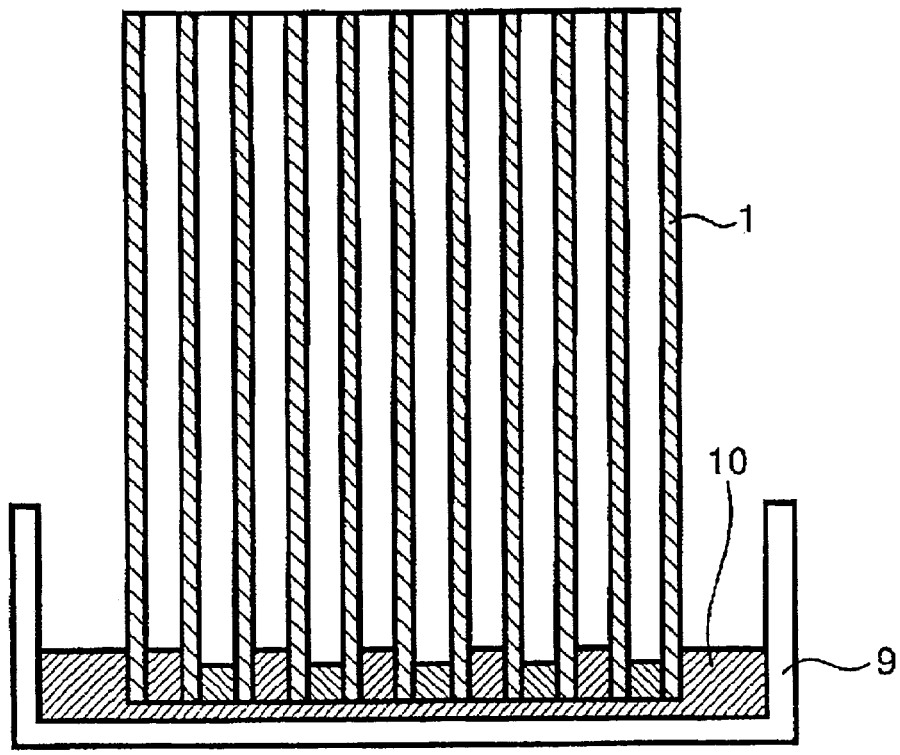
FIG. 3 is a schematic longitudinal section illustrating a filter at the time of packing a composition.

Now, a method of packing a composition 10 will be explained with reference to FIG. 3. A composition 10 in the form of a slurry is contained in a container 9 in a depth of about 50 mm. The composition 10 in the form of a slurry was prepared by adding 2% of polyvinyl alcohol and 50% of ethyl alcohol by outer percentage, to an inorganic mixture comprising 95% of metal silicon particles (purity 98%) having an average particle diameter of 10 μm and 5% of alumina particles having an average particle diameter of 3 mm, followed by thorough mixing.

Figure 4:
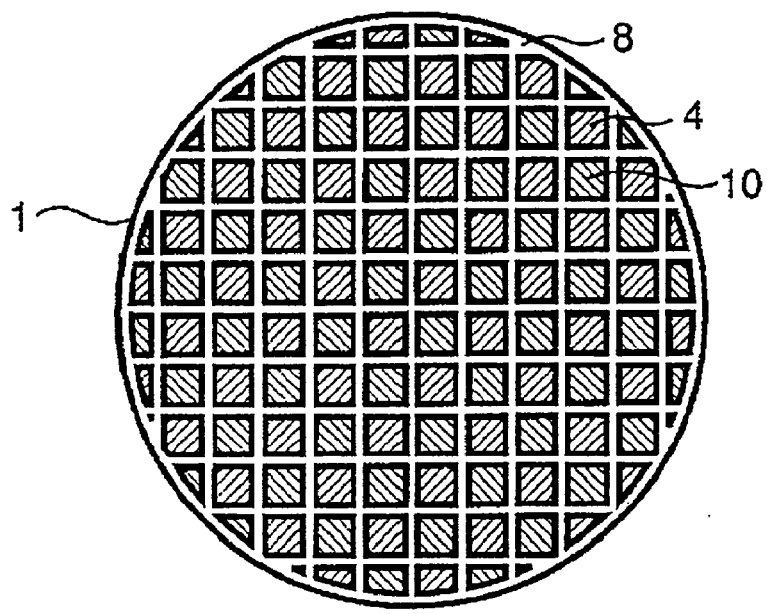
FIG. 4 is a schematic plan view illustrating the end surface of a filter before a masking material is removed.

The honeycomb filter 1 having the masking material 4 packed therein was immersed in the composition 10 in the container 9 in a depth of 10 mm from the end surface for one minute. After the immersion, the honeycomb filter 1 was taken out from the container 9 and adequately dried. The outer appearance of the end surface 8 of the honeycomb filter after the packing of the composition 10 was completed is shown in FIG. 4. The composition 10 and the masking material 4 were packed in a checkered pattern respectively.

Figure 5:
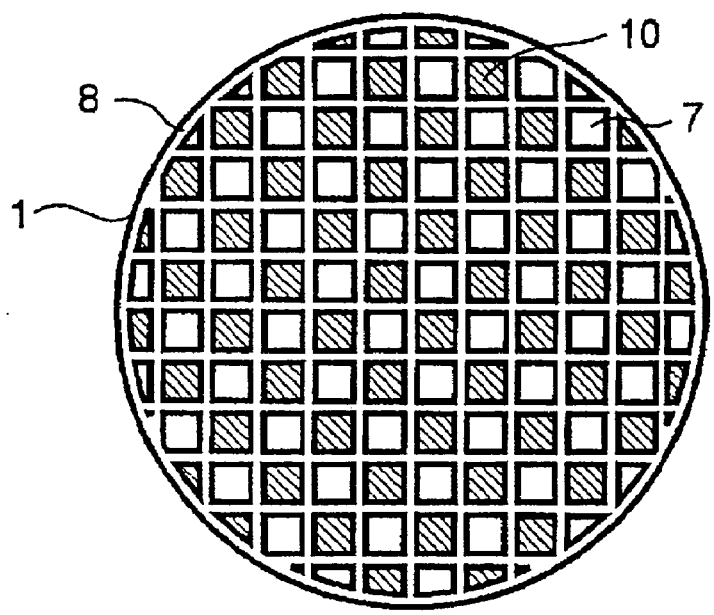
FIG. 5 is a schematic plan view illustrating the end surface of a filter after a masking material is removed.

In order to remove the masking material 4, the honeycomb filter 1 is put in a drying machine and heated in the air from room temperature to 150° C. at a temperature-raising rate of 300° C./h, held at 150° C. for one hour and then left to stand for cooling. After the honeycomb filter 1 was adequately cooled, it was taken out from the drying machine. In the obtained honeycomb filter 1, the composition 10 alone is packed in a checkered pattern on one end surface 8. The outer appearance of the end surface 8 of the honeycomb filter after the masking material is removed is shown in FIG. 5.

Figure 6:
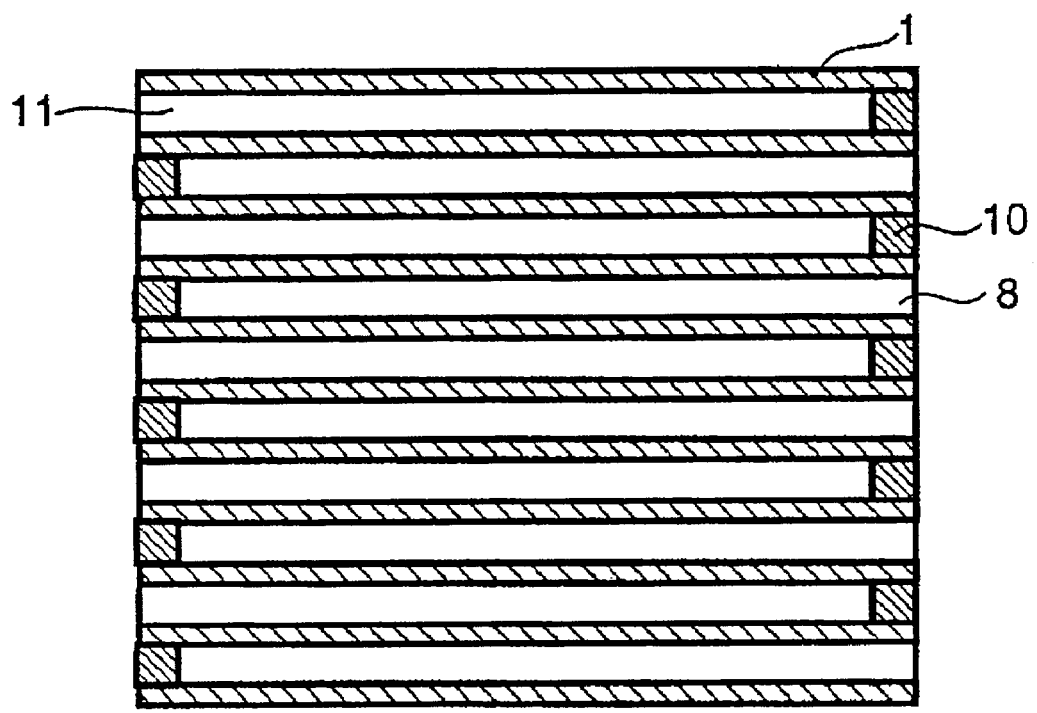
FIG. 6 is a schematic longitudinal section illustrating a filter after a masking material is removed.

Then, with respect to the other end surface 8 of the honeycomb filter 1, the composition 10 is packed in the same manner so that the composition 10 is packed in one end surface of the through-hole 11 and the other end surface is left open. That is, the composition 10 is packed in the checkered pattern on both end surfaces of the filter so that the composition 10 is packed in one end surface of each through-hole 11 and the other end surface is left open to obtain a honeycomb filter 1. The longitudinal section of the honeycomb filter 1 is shown in FIG. 6.

Then, the honeycomb filter 1 having the composition 10 alone packed therein was put in a sintering furnace capable of controlling the atmosphere and heated so that the metal silicon particles contained in the composition 10 were nitrided and the composition 10 functioned as a sealing material. As the conditions of the nitriding, the temperature was raised under a nitrogen pressure of 1.1 MPa from room temperature to 500° C. with a temperature-raising rate of 200° C./h, held at 500° C. for 2 hours, and then raised from 500° C. to 1,400° C. at a temperature-raising rate of 300° C./h, and held at 1,400° C. for 4 hours for nitriding. The nitriding ratio was 97% as calculated from the change in mass.

In order to confirm the sealing effect of the honeycomb filter 1 having both end surfaces sealed with the sealing material, an exhaust gas from a diesel engine was introduced to the honeycomb filter 1, and whether particulates were included in the exhaust gas after passed through the filter is confirmed by means of a smoke tester manufactured by Bacharach Company. As a result, the particulate concentration in the exhaust gas after passed through the filter was confirmed to be at level 1 among levels 1 to 10, the level 1 being lowest, and substantially no leakage through the sealing material was confirmed.

EXAMPLE 2 (COMPARATIVE EXAMPLE)

For comparison, to the same silicon nitride honeycomb filter as in Example 1, a film for masking, on which holes were preliminarily provided in a checkered pattern so that the sealing material passes therethrough, was attached, and the same sealing material as in Example 1 was packed by an injection method. Here, a part of the film for masking broke in the process of injection, and it was observed that the sealing material was packed in a part other than the part to be sealed. Further, incomplete packing and variation in the amount of the packed sealing material were visually observed.

According to the present invention, a sealing method can be provided, with which secure air-tightness at the filter end surface can be obtained, with which durability can be obtained, and which can be carried out easily with a high productivity. Further, with this method, metal silicon particles are used as a sealing material to seal the filter by a nitriding reaction, whereby substantially no firing shrinkage occurs, no crack or the like forms on the wall of the filter at the end surface, and the filter is less damaged.

The entire disclosure of Japanese Patent Application No. 2001-141931 filed on May 11, 2001 including specification, claims, drawings and summary are incorporated herein by reference in its entirety.

What is claimed is:

1. A method for sealing a silicon nitride filter having a generally columnar outer shape and a plurality of through-holes mutually parallel to one another, extending between the opposing end surfaces, which comprises
   selectively packing a composition containing metal silicon particles in the vicinity of the opening of the through-holes to be sealed on each end surface,
   subjecting the silicon nitride filter to a heat treatment in a nitrogen atmosphere so that the metal silicon particles contained in the composition are nitrided and formed into silicon nitride for sealing.

2. The method for sealing a silicon nitride filter according to claim 1, wherein the metal silicon particles have an average particle diameter from 1 to 150 μm.

3. The method for sealing a silicon nitride filter according to claim 1, wherein the amount of the metal silicon particles is from 70 to 98 mass % in the solid content of the composition.

4. The method for sealing a silicon nitride filter according to claim 1, wherein the composition comprises oxide particles.

5. The method for sealing a silicon nitride filter according to claim 4, wherein the oxide particles have an average particle diameter from 1 to 20 μm.

6. The method for sealing a silicon nitride filter according to claim 4, wherein the amount of the oxide particles is from 2 to 30 mass % in the solid content of the composition.

7. The method for sealing a silicon nitride filter according to claim 4, wherein the oxide particles comprise at least one member selected from the group consisting of alumina, iron oxide, yttria, spinel, magnesia, ytterbium oxide and mixtures thereof.

8. The method for sealing a silicon nitride filter according to claim 4, wherein the oxide particles comprise alumina, iron oxide or a mixture of alumina and iron oxide.

9. The method for sealing a silicon nitride filter according to claim 1, wherein the composition comprises a binder for molding.

10. The method for sealing a silicon nitride filter according to claim 9, wherein the binder for molding is polyvinyl alcohol, polyvinyl acetate or methyl cellulose.

11. The method for sealing a silicon nitride filter according to claim 9, wherein the amount of the binder for molding is from 2 to 5 mass % based on the solid content of the composition excluding the binder for molding.

12. The method for sealing a silicon nitride filter according to claim 1, wherein the heat treatment is carried out under conditions of a holding temperature from 1,100° C. to 1,800° C. and a holding time from 1 to 24 hours.

13. The method according to claim 1, comprising:
   first packing a masking material in the vicinity of the openings of through-holes to be left open;
   packing said composition containing metal silicon particles in the openings of through holes to be sealed on an end surface of said through holes,
   removing the masking material; and
   subjecting the filter having said composition packed therein to a heat treatment in a nitrogen atmosphere;
   thereby nitriding the metal silicon particles in the composition to form silicon nitride.

14. The method according to claim 1, wherein said vicinity is within about 20 to about 30 mm from an end surface.

15. The method according to claim 13, wherein said masking material is an organic substance having an amount of carbon remaining after thermal decomposition.

16. The method according to claim 13, wherein said masking material is removed by thermal decomposition.

17. The method according to claim 13, wherein said masking material is an organic polymer.

18. The method according to claim 13, wherein said masking material is polyethylene glycol.

19. The method according to claim 13, wherein said masking material is in a liquid state.

20. The method according to claim 13, wherein said masking material is packed according to a checkered pattern.

* * * * *